M. LEITCH.
DISK LINER FOR CENTRIFUGAL MACHINES.
APPLICATION FILED SEPT. 21, 1914.
1,160,624.
Patented Nov. 16, 1915.
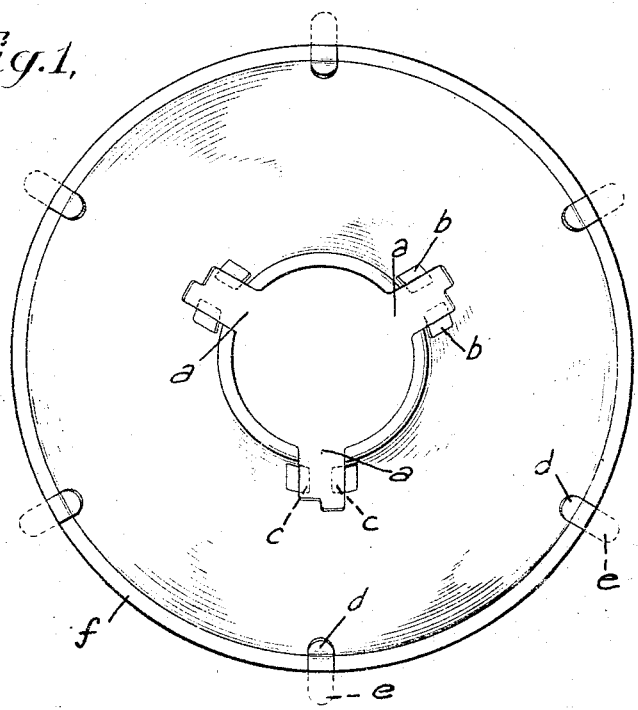
Fig.1,
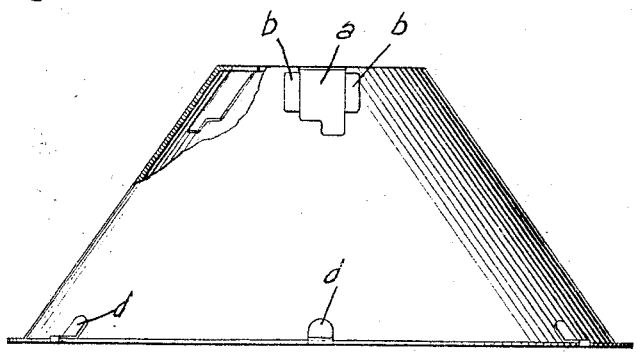
Fig.2,
WITNESSES
INVENTOR
Meredith Leitch
BY
ATTORNEYS

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

DISK LINER FOR CENTRIFUGAL MACHINES.

1,160,624. Specification of Letters Patent. Patented Nov. 16, 1915.

Application filed September 21, 1914. Serial No. 862,684.

*To all whom it may concern:*

Be it known that I, MEREDITH LEITCH, a citizen of the United States, residing in Poughkeepsie, county of Dutchess, State of New York, have invented certain new and useful Improvements in Disk Liners for Centrifugal Machines; and I do hereby declare the following to be a full, clear, and exact description of the invention, such as will enable others skilled in the art to which it appertains to make and use the same.

The present invention relates to disk liners for centrifugal machines, that is to say, plates having the form of the frustum of a cone and whose function is to divide the fluid to be centrifugalized into thin layers, for which purpose the said disk liners are nested, one above the other, in the centrifugalizing space, the individual members of the series being kept apart by separate calks so as to maintain the proper spacing between the disk liners.

The invention is of particular importance in the construction of disk liners for cream separators, although it has general applicability to disk liners employed in other centrifugalizing machines, as, for instance, in centrifugal clarifiers, centrifugal filters, and the like.

The main purposes of the invention are fourfold; first, to so locate the calks as to cause a minimum interference with the currents of liquid between the disks; secondly, to so place the calks as to reinforce the disks and provide more stock at points of maximum wear; thirdly, to make the calks of material ordinarily thrown away as scrap; and, fourthly, to avoid the necessity and the expense of using jigs for properly locating the calks on the disks as in the common practice of welding calks on disks. The manner in which these several objects are attained will be hereinafter more fully set forth.

In the accompanying drawing,—Figure 1 represents a top plan view of a disk made in accordance with the invention, the dotted lines indicating the original position of the stock from which the calks are made and which usually constitute part of the scrap; Fig. 2 represents a side elevation of the disk shown in Fig. 1.

Similar letters of reference indicate similar parts in both views.

Referring to the drawing, it will be noted that the disk represented therein is of the type, familiarly employed in centrifugal cream separators, centrifugal clarifiers, and centrifugal filters, wherein notches $a$ are provided which engage with and fit over guide-wings on the central hollow stem of the bowl. In nesting together a series of such disks, the notched portions of the disk slide down the sides of the guide-wings, and the maximum wear is at the forward and rear edges of the notches. At the extreme outer diameter of the disk represented by the horizontal edge portion $f$ there is a flow of skim milk outwardly, in cream separators and practically no flow of cream; consequently, because of the large diameter, there is a maximum area of milk flow along this outer edge, so that the location of the calks will cause a minimum interference with the milk outflow if they are spaced along the outer edge. So also, in cream separators, placing the inner row of calks close to the sides of the guide-wings will cause a minimum interference with the inward flow of cream, in the operation of a cream separator.

In the practice of the invention, I reserve from the otherwise scrap stock, usually cut off and discarded at the outer lower periphery of the disks in bringing them to form, a series of projections, as indicated by the dotted lines $e$ in Fig. 1. These projections $e$ are thus saved from the stock that is usually scrapped, and are then folded back on the body of the disk to form the series of lower calks $d$ along the trimmed edge portion, where, by reason of their favorable location they cause a minimum interference with the milk flow. So also, in cutting out the notches $a$, I reserve from the otherwise scrapped stock, the projections shown in dotted lines and marked $c$ in Fig. 1. These projections are thereupon folded back upon the body of the disks, at the radial side edges of the notches, so as to form the calk $b$. These calks $b$ are located at the points of maximum wear where the disks slide down the sides of the guide-wings and double the thickness of metal available for wear at those points.

It is, of course, evident that the calks $d$ and $b$ may be formed by bending the metal either upon the outer or upon the inner surface of the disk, without departing from the spirit of the invention, although, for most purposes it will be preferable to bend the mover on the upper side of the disk as shown. So also, while, in addition to the utilization of otherwise scrap metal to form the calks, it is of advantage to make them of the same material as the disks so as to avoid the necessity for using jigs to locate them thereon, it may be further pointed out that the advantageous position of the calks at the points where they exercise respectively minimum interference with the liquid constituents of the full milk undergoing separation may be realized by making the calks of separate pieces welded in place, and I accordingly desire to include this within the scope of my invention.

What I claim is:—

1. A disk for centrifugalizing machines having an outer row or series of calks extending radially inward at the extreme outer edge of the disks, and having an inner row or series of calks at the sides of the notches for the guide-wings.

2. A disk for centrifugalizing machines having an inner row or series of calks at the sides of the notches for the guide-wings.

3. A disk for centrifugalizing machines having an outer row or series of calks consisting of stock ordinarily trimmed off from the outer diameter of the periphery, the stock thus saved being bent back upon the disk in the form of tongues extending radially inward to form said calks.

4. A disk for centrifugalizing machines having an inner row or series of calks adjacent to the guide-wing notches, said calks being formed from material ordinarily punched out of said notches, said material being bent back upon the body of the disk at opposite sides of the notches.

In testimony whereof I affix my signature, in presence of two witnesses.

MEREDITH LEITCH.

Witnesses:
CHARLES L. POWELL,
WM. A. HUBBARD.